March 2, 1954  A. HALLER  2,670,966
STEERING MECHANISM FOR MOTOR VEHICLES
Filed Aug. 30, 1950  2 Sheets-Sheet 1

Inventor
Andreas Haller
By Michel my Padlow
Attorneys

March 2, 1954  A. HALLER  2,670,966
STEERING MECHANISM FOR MOTOR VEHICLES
Filed Aug. 30, 1950  2 Sheets-Sheet 2

Inventor
Andreas Haller
By Michel & Padlon
Attorneys

Patented Mar. 2, 1954

2,670,966

UNITED STATES PATENT OFFICE 2,670,966

STEERING MECHANISM FOR MOTOR VEHICLES

Andreas Haller, Munich, Germany, assignor to Bayerische Motoren Werke A. G., Munich, Germany, a corporation of Germany Application August 30, 1950, Serial No. 182,280

3 Claims. (Cl. 280—95)

1

The present invention relates to steering mechanisms for motor vehicles of the type having independently sprung steerable wheels guided generally vertically with respect to the longitudinal axis of the vehicle, for instance by parallelogram linkages, the steering movement being effected by divided steering tie rods.

It is the main object of the invention to provide a geometrically unobjectionable steering mechanism in which, independently of the springing movements of the steerable wheels, both when driving straight ahead and when cornering, no differences occur between the guidance of the wheels by parallelogram and the tie rods participating in the swinging movements, so that the disadvantageous shimmying of the steerable wheels will be avoided. There are already various proposals in this connection which consist, for instance, in making the length of the divided steering tie rod as nearly as possible equal to the length of the swinging arms serving to suspend the wheels. Further it has been proposed in the case of steerable wheels swinging parallelly with relation to the longitudinal axis of the vehicle to arrange the steering linkage in such a manner that the distance from the inner to the outer articulation point of the steering tie rod equals in projection on the plane of oscillation of the steerable wheels to the length of the projection of the supporting levers on the same plane of oscillation.

Such known constructions have indeed considerably reduced the disadvantageous shimmying of the steerable wheels without making it possible, however, to realize an entirely independent steering under all conditions of travel which hitherto could not be obtained. This circumstance is based on the fact that in the steerable wheel suspension systems commonly in use up to the present day the king pins of the front wheels are not perpendicular but include an acute angle with a vertical plane extending in the longitudinal direction of the vehicle in order to obtain a favourable radius of rolling circle. In this case there cannot be present the necessary primary conditions during the springing movement of the wheels in the hitherto known constructions so that complete independence of steering during spring deflection cannot be obtained. On the contrary there will be differences in the swinging motions of the wheels occurring again in the steering linkage during the springing and simultaneous steering movements of the wheels thereby causing undesired shimmying.

In order to avoid this disadvantage the invention provides that, in the event of the king pin

2 axis being arranged so as to include an acute angle with a vertical plane in the longitudinal axis of the vehicle, the longitudinal axes of the journals for the steering knuckle arms providing connection with the divided tie rods, on which latter simultaneously also the transmission levers to the connecting bar of the two steering knuckle arms are supported, have the same or substantially the same acute angle as the longitudinal axes of the king pins.

A further feature of the present invention consists in that the journal for the steering knuckle arms and the transmission levers respectively, at the steering gear side simultaneously serve as a steering arm shaft, to which journal the driven wheel or the corresponding part of the steering gear is rigidly secured. In this way the advantage is obtained that the hitherto usual steering arm and the distance rod can be omitted so that the design according to the invention permits the omission of two joints in the entire steering system. It is immaterial in this connection which type of steering gear is used and it is possible to employ a steering gear of the bevel gear, helical gear or worm type or the like.

The invention will be more readily understood from the following detailed description of several preferred embodiments thereof, shown by way of example in the accompanying drawing.

Figure 2:
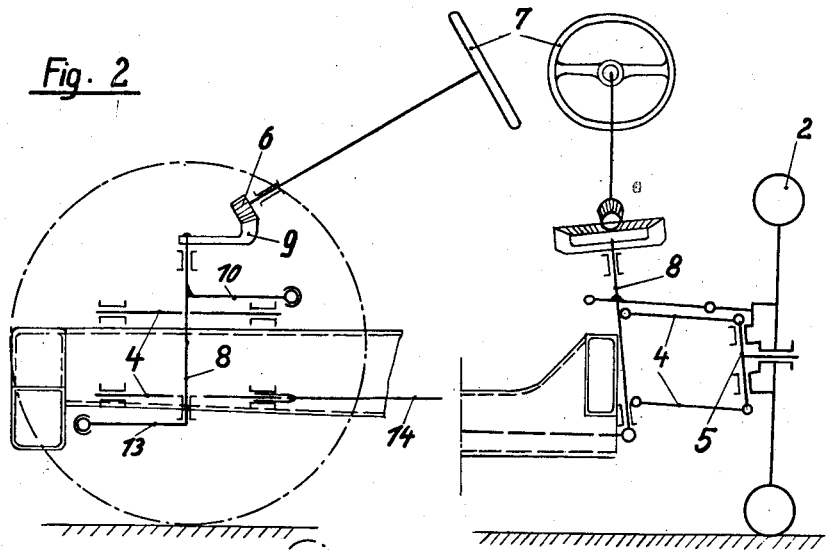
Fig. 2 is an elevational view of the steering mechanism illustrated in Fig. 1.
Figure 3:
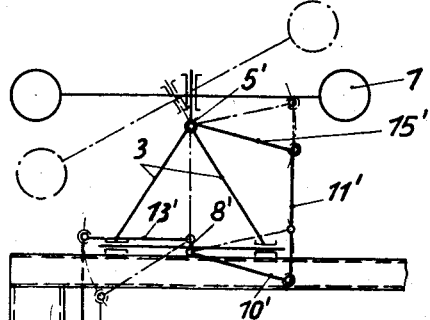
Fig. 3 is a front view.
Figure 1:
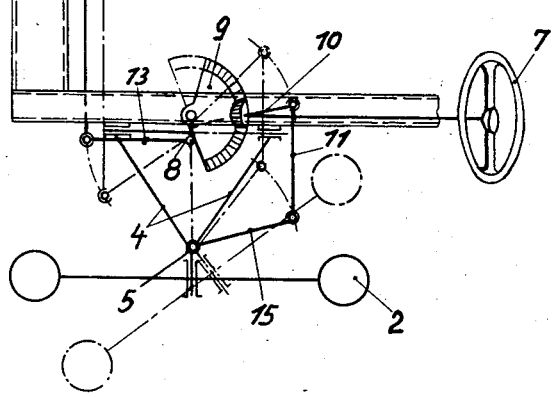
Fig. 1 is a plan view of the steering mechanism.

Referring to the form of embodiment shown in Figs. 1, 2 and 3 of the drawing, the independently sprung steerable wheels 1 and 2 are supported on the frame by means of a parallelogram linkage, comprising arms 3, 4 so as to allow swinging transversely to the direction of travel. The longitudinal axis of the king pin 5 makes an acute angle with a vertical plane longitudinal of the vehicle. The steering movement of the front wheels is initiated through the intermediary of the steering gear 6 operated by the steering wheel 7. The steering gear used in the example of construction is a bevel gearing. According to the invention the steering arm shaft 8, to which the crown wheel 9 is secured, forms simultaneously the journal for the steering knuckle arm 10 providing connection with the steering tie rod 11 at the steering gear side. At the lower end of the journal 8 there is also secured the transmission lever 13 which transmits the steering movement through the mediation of the tie rod 12 to the right-hand front wheel 1.

At the right-hand side a journal 8' is provided to which is secured the transmission lever 13' and the steering knuckle arm 10', which actuates the right-hand tie rod 11'.

The arrangement of the transmission levers 13 and 13' at the lower end of the journals 8 and 8' provides the advantage that the engine can be located forwardly as far as possible independently of the front wheel suspension and the usual steering linkages since the connecting bar 12 (or 23 in the modification of Figs. 4–6), which is substantially unaffected by the springing system, does not exert any influence on the location of the engine in the longitudinal direction. In this way a desirable enlargement of the disposable internal space of the car is obtained with the same wheelbase. This arrangement of the transmission levers further permits locating the connecting bar 12 in protected position behind the forward frame cross member or, for instance, also within the same.

The steering knuckle arms 10 and 10' are arranged on the upper half of the journals 8 and 8' in such a manner that the tie rods 11 and 11' extend in or substantially in the same plane as the upper swinging arms 3 and 4 of the suspension parallelogram, the length of steering tie rods being selected in a manner known as such so as to be equal to the length of the swinging arms in the plane in which the steering tie rod is arranged. In the example of construction illustrated the length of the divided steering tie rods 11 and 11' is equal to that of the upper swinging arms of the parallelogram linkage, since the length of the lower swinging arms, as is known, should be greater, in order to permit the most favourable guidance of the wheel. The arrangement of the steering tie rods according to the invention in or substantially in the plane of the upper swinging arms permits in addition the application, for instance, of a torsion bar suspension which may be used advantageously for the suspension of the front wheel, in which case the torsion rod 14 can be arranged in a favourable manner in alignment with the pivotal mounting of the lower swinging arms, as shown in Fig. 2. The steering knuckle gear rod arms 15 and 15' respectively, in this arrangement, extend rearwardly longitudinally of the vehicle so that the geometrically most favourable angular position can be selected for said arms.

Figure 5:
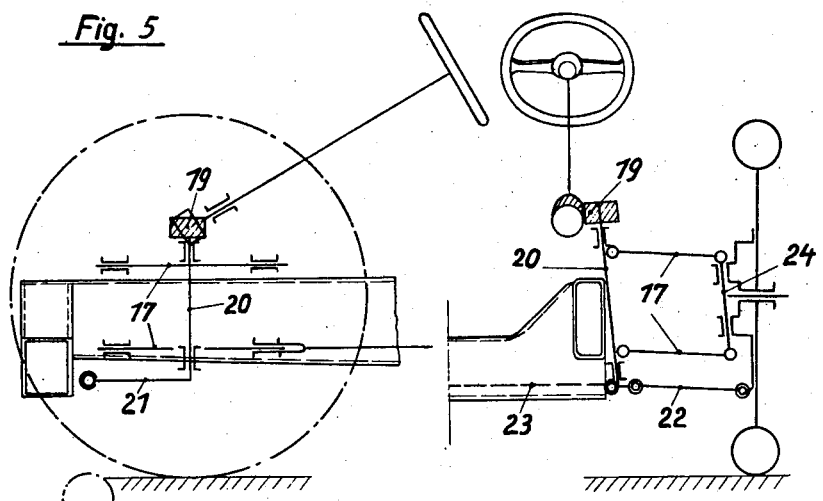
Fig. 5 is an elevational view of the modification illustrated in Fig. 4.
Figure 6:
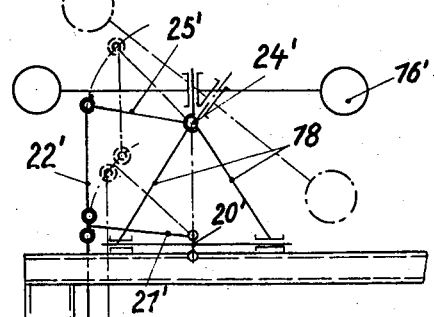
Fig. 6 is a front view.
Figure 4:
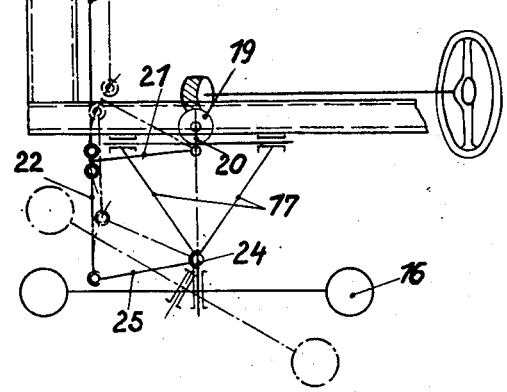
Fig. 4 is a plan view of a modification of the steering mechanism.

In the form of embodiment illustrated in Figs. 4, 5 and 6, the steerable wheels 16 and 16' are similarly suspended transversely to the direction of travel by means of jointed parallelogram linkages 17 and 18. As a steering gear in this case, for instance, a worm gear 19 is used, the steering arm shaft 20 being likewise secured directly to the steering knuckle arm 21. In this form of embodiment the steering knuckle arm 21 is arranged at the lower end of the journal 20 and carries two joints, the steering tie rod 22 being associated with the outer joint and the connecting bar 23 with the inner joint so that the transmission levers can be omitted. The connecting bar 23 actuates the right-hand steering knuckle 21' to which the steering tie rod 22' is articulated. The steering tie rods 22 and 22' actuate the steering knuckle gear rod arms 25 and 25'. It is essential in this case that according to the invention the two journals 20 and 20' include the same acute angle with a vertical plane extending in the longitudinal axis of the vehicle as the corresponding king pins 24 and 24'. The steering knuckle gear rod arms 25 and 25' are in this form of embodiment in or substantially in the plane of the lower swinging arms of the wheel suspension and accordingly have as nearly as possible the length of the lower swinging arms.

The construction according to the invention permits an entirely independent steering in which no differences occur during spring deflection between the guidance by the parallelogram linkage of the steerable wheels and the steering tie rods participating in the swinging motion of the wheels whether driving straight ahead or cornering. It will be understood that the invention is not limited to the forms of embodiment disclosed.

What is claimed is:

1. Means for supporting and steering steerable wheels for a vehicle, comprising a vehicle frame, two superposed generally horizontal outwardly extending arms of equal length pivoted to said frame for swinging motion in a generally vertical plane generally perpendicular to the longitudinal axis of the vehicle, a king pin pivoted to the outer ends of said arms, said king pin being of such length as to form a parallelogram linkage with said arms and frame, and being located in a generally vertical plane generally transverse to the vehicle and having its lower end located further outwardly than its upper end, a wheel axle support journaled on said king pin, a steering arm shaft journaled in the frame substantially parallel to the said king pin, a steering arm attached to said shaft and a steering tie rod pivoted at one end to said steering arm and at its other end to a steering arm extending from said wheel axle support in a direction generally longitudinally of the vehicle, the steering tie rod being generally parallel to said outwardly extending wheel supporting arms, together with another steering arm attached to said steering arm shaft extending forwardly therefrom and a connecting link articulated at one of its ends to said last mentioned steering arm and at its other end to means for steering another steerable wheel.

2. Means for supporting and steering steerable wheels for a vehicle, comprising a vehicle frame, a pair of superposed generally horizontal arms of equal length extending outwardly from each side of the vehicle and pivoted to said frame for swinging motion in a generally vertical plane generally perpendicular to the longitudinal axis of the vehicle, a king pin pivoted to the outer ends of each of said pair of arms, said king pins being of such lengths as to form parallelogram linkages with their respective arms and the frame and each being located in a generally vertical plane generally transverse to the vehicle and having their lower ends located further outwardly than their upper ends, a wheel axle support journaled on each of said king pins, a steering arm shaft journaled in the frame nearer to one of said king pins than the other king pin and substantially parallel to the said nearer king pin, at least one steering arm attached to said shaft and two steering tie rods each pivoted at one end to said steering arm and at its other end to a steering arm connected with said wheel axle supports, the steering tie rods being generally parallel to said outwardly extending wheel supporting arms.

3. Means for supporting and steering steerable wheels for a vehicle, comprising a vehicle frame, a pair of superposed generally horizontal arms of equal length extending outwardly from each side of the vehicle and pivoted to said frame for swinging motion in a generally vertical plane generally perpendicular to the longitudinal axis of the vehicle, a king pin pivoted to the outer ends of each of said pair of arms, said king pins being of such lengths as to form parallelogram linkages with their respective arms located in a generally vertical plane generally transverse to the vehicle and having their lower ends located further outwardly than their upper ends, a wheel axle support journaled on each of said king pins, a steering arm shaft journaled in the frame nearer to one of said king pins than the other king pin and substantially parallel to the said nearer king pin, two steering arms attached to said shaft and a steering tie rod pivoted at one end to one of said steering arms and at its other end to a steering arm extending rearwardly from said nearer wheel axle support in a generally horizontal plane, the steering tie rods being generally parallel to said outwardly extending wheel supporting arms, together with a second steering tie rod pivoted at one of its ends to the other of said steering arms attached to said shaft and having its other end connected to the other vehicle wheel for steering the said other vehicle wheel.

ANDREAS HALLER.

References Cited in the file of this patent

UNITED STATES PATENTS

| Number | Name | Date |
|---|---|---|
| 2,130,288 | Olley | Sept. 13, 1938 |
| 2,164,470 | Opolo | July 4, 1939 |
| 2,173,667 | Slack | Sept. 19, 1939 |
| 2,297,591 | Urich | Sept. 29, 1942 |
| 2,334,702 | Newton et al. | Nov. 23, 1943 |
| 2,549,925 | Paton | Apr. 24, 1951 |